United States Patent Office 3,375,198
Patented Mar. 26, 1968

3,375,198
ALKALI METAL PERBORATES
Walter Jacob Rosenfelder, London, England, assignor to United States Borax & Chemical Corporation, Los Angeles, Calif.
No Drawing. Filed June 7, 1965, Ser. No. 462,046
Claims priority, application Great Britain, July 24, 1964, 29,782/64
15 Claims. (Cl. 252—99)

ABSTRACT OF THE DISCLOSURE

Dry, granular alkali metal perborate is produced by mixing with agitation a particulate alkali metal metaborate and hydrogen peroxide in the presence of water not exceeding the amount required to form a product having no uncombined water. Preferably not more than about 80% of the theoretical requirement of water is used. The alkali metal metaborate can also be formed in situ by reaction of a borate, such as sodium tetraborate, with sodium hydroxide. Composite granules having a core of sodium borate and an adherent shell of sodium perborate can be formed.

---

This invention relates to peroxygenated compounds and, more particularly, it relates to novel alkali metal perborate compositions and to methods for their production.

Sodium perborate ($NaBO_2 \cdot H_2O_2 \cdot 3H_2O$, also written $NaBO_3 \cdot 4H_2O$) is very widely used as a bleaching agent in detergent compositions, particularly those intended for household use. Its bleaching action is due to the release of "active" oxygen which occurs spontaneously in the presence of water at temperatures above about 60° C.

Sodium perborate is usually prepared by the reaction of borax, sodium hydroxide and hydrogen peroxide in aqueous solution. The reaction may be represented as follows:

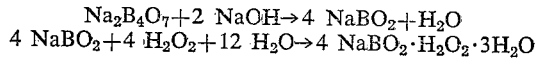

$4\ NaBO_2 + 4\ H_2O_2 + 12\ H_2O \rightarrow 4\ NaBO_2 \cdot H_2O_2 \cdot 3H_2O$ The perborate is obtained as a fine crystalline material, which is difficult or impossible to distribute uniformly throughout granular detergent compositions. Segregation of the detergent and the perborate readily occurs and often a wide divergence is found in the sodium perborate content of two packages of detergent composition filled from the same batch. For example, two apparently identical boxes of a household detergent composition have been found to contain in one 6.0% and in the other 31% of sodium perborate. The perborate is also particularly subject to deterioration, especially when, as is conventional, it is associated with accelerators (sometimes known as "low temperature bleach enhancing agents") if stored in an open package in a humid atmosphere, as is often present in a normal household room used for washing.

The present invention provides a new method of producing alkali metal perborates, such as sodium perborate, which enables a granular product to be obtained which, when embodied in granular detergent compositions, has little or no tendency to segregate.

In one aspect, the invention comprises the method of producing dry, granular sodium perborate products by mixing with agitation a particulate sodium metaborate or a particulate mixture of a sodium borate containing more than one mole of $B_2O_3$ per mole of $Na_2O$ and sodium metaborate, with hydrogen peroxide, preferably in an amount of not more than one mole of hydrogen peroxide per mole of sodium metaborate ($NaBO_2$), in the presence of water so as to form a dry, granular, substantially non-efflorescent product consisting of or containing sodium perborate. Desirably the degree and duration of agitation is such that the size of a major proportion, preferably at least 60–70% of the particles is within the range of from about 25 to about 60 mesh U.S.S. (22–60 mesh B.S.S.), especially from about 25 to 42 mesh. Sodium tetraborate and sodium pentaborate are typical examples of sodium borates containing more than one mole of $B_2O_3$ per mole of $Na_2O$.

The sodium perborate product thus obtained is in granular, free-flowing form and is compatible with ordinary detergent mixtures. It evolves oxygen rapidly at temperatures of about 60°–650 C. and is of good stability, samples examined having been found to lose no more than 3% of their active oxygen during storage under normal conditions for six weeks.

When the theoretical amount of hydrogen peroxide is used (one mole per mole of sodium metaborate), the metaborate becomes converted substantially completely into sodium perborate. While the use of a small excess of hydrogen peroxide may be desirable to compensate for decomposition, large excesses are wasteful and are preferably avoided. When less than the theoretical amount is used, the product comprises individual composite granules each consisting of a core of sodium metaborate and/or another borate with an adherent shell comprising sodium perborate. These composite granules are novel and are included within the scope of the invention. Any borate such as sodium metaborate or sodium tetraborate in the core of the granule is in itself a valuable adjunct to a detergent in which it is incorporated, dissolving in the washing water and then acting efficiently as a water softening agent.

The amount of water present in the reaction mixture must be restricted to avoid the production of a product which contains uncombined water or which is efflorescent on storage. Not only any water added to the reaction mixture, but also water of hydration in the starting materials and also water of reaction, must be taken into account. For example, when sodium metaborate is converted substantially completely into sodium perborate, that is, by using about one mole of hydrogen peroxide per mole of metaborate ($NaBO_2$), the total water present should not exceed that necessary to form sodium perborate tetrahydrate

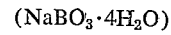

When the metaborate is only partly converted, the total water present should not exceed that necessary to give the tetrahydrate of the sodium perborate formed and the tetrahydrate of the residual sodium metaborate. Preferably the total water present in the mixture should not exceed about 80% of that theoretically required to produce a product in which all the water is in combined form.

Preformed sodium metaborate, preferably as sodium metaborate dihydrate ($NaBO_2 \cdot 2H_2O$), can be used as starting material, or the sodium metaborate can be formed in situ, for example, by reacting a sodium tetraborate or another sodium borate containing more than one mole of $B_2O_3$ per mole of $Na_2O$ with not more than the theoretical requirement of sodium hydroxide. Sodium metaborate formed in situ appears to react more rapidly with the hydrogen peroxide than preformed sodium metaborate. When using sodium tetraborate as starting material, the tetraborate, preferably in anhydrous form, can be mixed with a quantity of sodium hydroxide which will convert the tetraborate partially into the metaborate, that is, less than 2 moles of NaOH per mole of tetraborate. Use of two moles of hydrogen peroxide for every mole of sodium hydroxide then gives a product comprising granules consisting of a core of sodium tetraborate and an outer shell of sodium perborate. If the molar quantity of hydrogen peroxide used is less than twice that of the sodium hydroxide, the outer shell will contain both sodium metaborate and sodium perborate.

When the sodium metaborate is formed in situ, the sodium hydroxide in the form of an aqueous solution can be mixed with the sodium tetraborate or other borate and thereafter the hydrogen peroxide is added. The sodium hydroxide and hydrogen peroxide can also be mixed simultaneously with the borate. Separate aqueous solutions can be used, but preferably an aqueous solution containing both the sodium hydroxide and the hydrogen peroxide is added to the borate. Solid sodium hydroxide can either be dissolved in hydrogen peroxide or hydrogen peroxide can be mixed with a previously prepared solution of sodium hydroxide. Since hydrogen peroxide tends to decompose at elevated temperatures, it is essential that when the hydrogen peroxide and sodium hydroxide are mixed together the mixture is kept cool. Partial decomposition of the hydrogen peroxide is most readily prevented by mixing solutions of the components rather than atempting to dissolve solid sodium hydroxide directly in hydrogen peroxide.

The hydrogen peroxide and any sodium hydroxide necessary are preferably added to the borate separately or in admixture in aqueous solution. Preferably, the solution or solutions are sprayed onto the solid. The solid borate must be agitated during the addition, preferably in a rotating drum type mixer, a ribbon mixer or a Z-blade mixer. The reaction is best carried out at ambient temperatures, the temperature of the reactants not being allowed to exceed about 50° C. Preferably, the reaction mixture should be maintained at about 20° C. or below. If necessary, the reaction mixture can be cooled to avoid overheating.

The following examples illustrate the invention but the invention is not to be considered limited to the specific examples. All parts are by weight.

*Example I*

Fifty-seven parts of "100 Vol" hydrogen peroxide (0.33 mole of $H_2O_2$) was slowly sprayed onto 204 parts of sodium metaborate dihydrate contained in a rotating drum type mixer. The addition took 30 minutes. Mixing was continued for twenty minutes after the end of the addition. The product was a dry, free-flowing granular material in which substantially all the particles were of size 25–42 U.S.S. mesh. On analysis, the material was found to contain 91% of the available oxygen originally present in the hydrogen peroxide. After storage in a loosely stoppered screw cap bottle for a period of 1 week, a loss of 1% of available oxygen had occurred. After 6 weeks the loss was still only 3%.

*Example II*

A cold, aqueous solution of 10 parts of sodium hydroxide (0.25 mole) in 40 parts of water was added to 86 parts of "100 Vol" hydrogen peroxide (0.5 mole $H_2O_2$). The resultant solution was sprayed onto anhydrous sodium tetraborate (200 parts; 1 mole) while agitated in a Z-blade mixer over a period of ten minutes. A dry, granular, free-flowing material was obtained in which substantially all the particles were of size 25–42 U.S.S. mesh. On analysis, the material was found to contain 95% of the available oxygen originally present in the $H_2O_2$. On storage for 8 weeks in an ordinary screw cap container, the product lost only a further 2%.

*Example III*

Sodium hydroxide (1.88 parts; 0.047 mole) was carefully dissolved in 12 parts of "100 Vol" hydrogen peroxide (0.07 mole $H_2O_2$) with cooling. The resulting solution was carefully sprayed onto 112 parts of sodium tetraborate pentahydrate with agitation to form a dry, granular product in which substantially all the particles were of size 25–42 U.S.S. mesh. The product contained 91% of the available oxygen originally contained in the hydrogen peroxide. It has excellent storage stability, losing only 2% of oxygen after 6 weeks.

The products of Examples I to III reacted rapidly with water at 60°–65° C. to release their available oxygen and did not separate when mixed with granular detergents.

While the process of the invention has been particularly described above with reference to sodium perborate, it is applicable also to the production of other granular alkali metal perborates, such as potassium perborate and lithium perborate.

Various changes and modifications of the invention can be made and, to the extent that such variations incorporate the spirit of this invention, they are intended to be included within the scope of the appended claims.

I claim:
1. The method of producing a dry, granular, substantially non-efflorescent alkali metal perborate which comprises intimately admixing with agitation at a temperature not exceeding about 50° C. a particulate alkali metal metaborate and hydrogen peroxide in the presence of water not exceeding the amount required to form a product in which all the water is in combined form, and continuing agitation of the reaction mass to thereby form a dry, granular product, the major proportion of which is of a particle size within the range of from about 25 to about 60 U.S.S. mesh.

2. The method according to claim 1 in which the major proportion of said product has a particle size of from about 25 to 42 U.S.S. mesh.

3. The method according to claim 1 in which the mole ratio of said hydrogen peroxide to alkali metal metaborate is not more than 1:1.

4. The method according to claim 1 in which the total water present in the reaction mixture is not in excess of about 80% of the theoretical amount to provide a product in which all water is in combined form.

5. The method according to claim 1 in which said alkali metal metaborate is sodium metaborate dihydrate.

6. The method according to claim 1 in which said alkali metal metaborate is in admixture with an alkali metal borate containing more than one mole of $B_2O_3$ per mole of $M_2O$, where M is an alkali metal.

7. The method according to claim 1 in which the reaction mass is maintained at a temperature of not more than about 20° C.

8. The method for producing dry, granular, substantially non-efflorescent sodium perborate which comprises reacting sodium hydroxide and hydrogen peroxide with sodium tetraborate by spraying said sodium hydroxide and said hydrogen peroxide in aqueous solution onto the solid sodium tetraborate while agitating the reaction mass at an ambient temperature of not higher than about 50° C., to form a dry, granular product, the total amount of water present in the reaction mixture being not in excess of that required to produce a product in which all the water is in combined form.

9. The method according to claim 8 in which the reaction mass is agitated in a rotating drum mixer.

10. The method according to claim 8 in which the reaction mass is maintained at a temperature of not more than about 20° C.

11. The method according to claim 8 in which the reaction mass is agitated in a Z-blade mixer.

12. The method of producing dry, granular, substantially non-efflorescent sodium perborate which comprises intimately admixing with agitation at a temperature not exceeding about 50° C. hydrogen peroxide and particulate sodium metaborate in a molar ratio of not more than one mole of hydrogen peroxide per mole of sodium metaborate, in the presence of water sufficient to provide a hydrated product but not sufficient to provide uncombined water, whereby a dry, granular product having a major proportion of particles of about 24 to 60 U.S.S. mesh is formed.

13. The proces of claim 12 in which said sodium metaborate is formed in situ by reaction of sodium tetraborate with sodium hydroxide.

14. The process of claim 12 in which said sodium metaborate is sodium metaborate dihydrate.

15. The method according to claim 12 in which the reaction mass is maintained at a temperature of not more than about 20° C.

References Cited
UNITED STATES PATENTS

| | | | |
|---|---|---|---|
| 3,154,494 | 10/1964 | Speak et al. | 252—99 |
| 3,161,597 | 12/1964 | Joung | 252—99 |

MURRAY KATZ, *Primary Examiner.*

LEON D. ROSDOL, *Examiner.*

M. WEINBLATT, *Assistant Examiner.*